United States Patent
Totale et al.

(10) Patent No.: US 10,225,316 B1
(45) Date of Patent: Mar. 5, 2019

(54) METHOD AND MECHANISM FOR DATA SOURCE FETCH THROUGH VIRTUAL DATA SOURCE

(71) Applicant: EMC Corporation, Hopkinton, MA (US)

(72) Inventors: Sachin Gopaldas Totale, Pleasanton, CA (US); Jobin John, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 656 days.

(21) Appl. No.: 14/840,991

(22) Filed: Aug. 31, 2015

(51) Int. Cl.
*G06F 17/30* (2006.01)
*H04L 12/26* (2006.01)
*H04L 29/08* (2006.01)

(52) U.S. Cl.
CPC .............. *H04L 67/02* (2013.01); *H04L 43/16* (2013.01); *H04L 67/1097* (2013.01); *H04L 67/289* (2013.01); *H04L 67/2842* (2013.01); *H04L 67/2847* (2013.01); *G06F 17/30132* (2013.01)

(58) Field of Classification Search
CPC . H04L 67/2842; H04L 67/1097; H04L 67/34; H04L 67/02; H04L 67/2847; H04L 43/16; H04L 67/289; G06F 17/30132
See application file for complete search history.

(56) References Cited

U.S. PATENT DOCUMENTS

| 9,747,141 | B2* | 8/2017 | Caunter | G06F 9/542 |
| 2017/0311128 | A9* | 10/2017 | Dicke | H04W 4/028 |
| 2018/0012629 | A1* | 1/2018 | Jaime | G11B 27/031 |

OTHER PUBLICATIONS

EMC, "Getting Started with xCP 2.0", XCP2.0 Self-Paced Tutorial, Dec. 2012 (207 pages).
"EMC Documentum xCP Designer Help Version 2.0 User Guide", EMC Corporation, 2012 (325 pages).
"EMC Documentum xCelerated Composition Platform Designer Help", Version 2.1 User Guide, EMC Corporation, corporate Headquarters, Hapkinton, MA, 2009-2014 (373 pages).
"EMC Documentum xCelerated Composition Platform:", Version 2.1 Developer Guide, EMC Corporation, Corporate Headquarters, Hopkinton, MA, 2009-2014 (82 pages).

* cited by examiner

*Primary Examiner* — David R Lazaro
(74) *Attorney, Agent, or Firm* — Chamberlain, Hrdlicka, White, Williams & Aughtry (57) ABSTRACT

Data source fetch includes initiating execution of a web application on a client device. The client device initiates a local session variable for the web application. Initiating the local session variable includes obtaining a value of a data item from a server via a network, and storing the value in the local session variable on local storage. While executing the web application, the client device obtains the value from the local session variable by a plurality of widgets in the web application, and processes the value by the web application.

18 Claims, 7 Drawing Sheets

METHOD AND MECHANISM FOR DATA SOURCE FETCH THROUGH VIRTUAL DATA SOURCE

BACKGROUND

A web application is a software application that executes in a web browser. The web application may include one or more features, such as graphical user interface widgets, processes, and other aspects of the web application. In developing a web application, a developer may desire to have a webpage prepopulated with data that may then be updated by an end user.

BRIEF DESCRIPTION OF DRAWINGS

FIGS. 5.1, 5.2, and 5.3 show examples in accordance with one or more embodiments of the technology.

DETAILED DESCRIPTION

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to optimizing data source fetch. In other words, one or more embodiments store semi-static information in a local session variable on the client. Thus, when a web application is executed, rather than accessing a remote storage to populate widgets, the web application may access local storage having the session variable.

Figure 1:
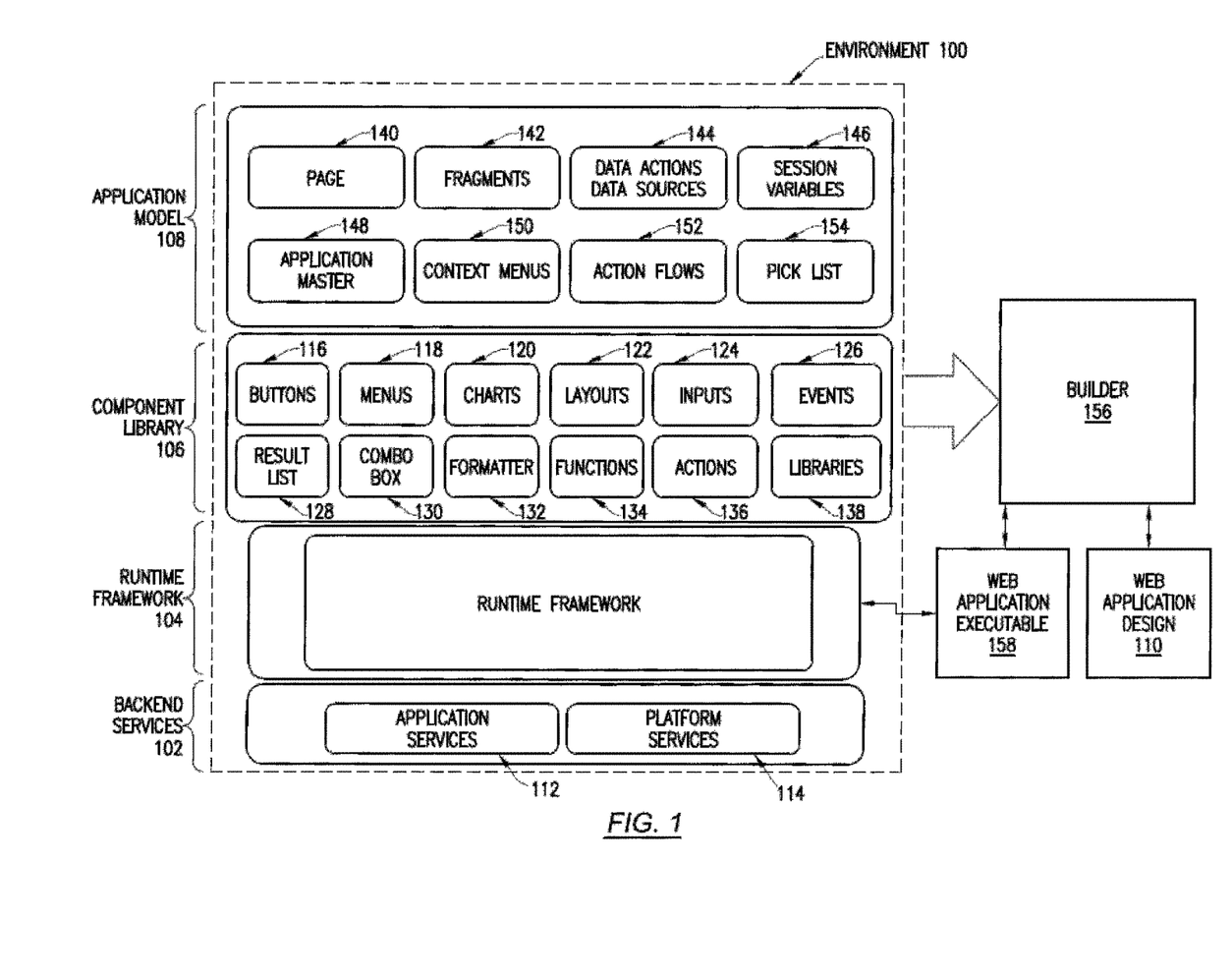
FIGS. 1 and 2 show schematic diagrams of systems in accordance with one or more embodiments of the technology.

FIG. 1 shows a schematic diagram of a system in accordance with one or more embodiments of the technology. Specifically, FIG. 1 shows a schematic diagram of an environment (100) for developing and executing a web application that implements the context menu fragment management. As shown in FIG. 1, the environment (100) includes backend services (102), a runtime framework (104), a component library (106), and an application model (108). Each of the aforementioned components is described below.

In one or more embodiments of the technology, backend services (102) are services that are not shown to the developer and ease the development of the web application design (110). The backend services (102) may include application services (112) and platform services (114). In one or more embodiments of the technology, the application services (112) allow a user interface based web application to be built on top of a generic model of a web application.

In one or more embodiments of the technology, the platform services (114) are services that manage the application for multiple different platforms. The multiple different platforms may have heterogeneous operating systems, devices, and/or display device sizes.

In one or more embodiments of the technology, the runtime framework (104) provides a runtime environment for a web application executable (158). Specifically, the runtime framework (104) manages the data and events of the executing web application executable (158). The runtime framework (104) is described in FIG. 2 and below.

In one or more embodiments of the technology, the component library (106) is a library of application components that a developer may add to the web application design (110). In other words, the developer may select components from the component library (106) to add functionality to the web application design (110). The component library (106) may include user interface (UI) components and processing components.

In one or more embodiments of the technology, UI widgets are components that are displayed to an end user. In other words, instances of the UI widgets are displayed on a display device. In one or more embodiments of the technology, the UI widgets may include, but are not limited to, buttons (116) (e.g., radio buttons, common buttons), menus (118) (e.g., drop down menu, check boxes), charts (120), layouts (122), inputs (124) (e.g., fields) and combo boxes (130). UI widgets in the component library may each be associated with a set of options. The set of options define the execution of the UI widget. Namely, the set of options define how a particular instance of the component is executed. Options associated with the UI widgets may include formatting, any text that is displayed, any action that is to be performed when the UI widget is selected, other options, and/or any combination thereof. In one or more embodiments of the technology, UI widgets may be bound to one or more business object types. In other words, the UI widgets may display data in or derived from one or more instances of a business object type.

In one or more embodiments of the technology, a business object type is a representation of a type of real-world object used by a business. For example, a business object type may be a customer, an employee, a product, a company, or other object type. A business object type may include multiple attributes. The attributes are the properties of the real-world object, such as name, address, price, and other attributes. An instance of a business object type is a particular business object having attribute values. For example, if a business object type is employee, an instance of an employee business object type is a representation of a particular employee.

In one or more embodiments of the technology, the processing components are components that are hidden to the end user (i.e., are not displayed to the end user). For example, the processing components may include events (126), result lists (128), formatter (132), functions (134), actions (136), and libraries (138). Each of the processing components is discussed below.

Formatter (132) is instructions which enable arranging of the data in specific formats in accordance with one or more embodiments of the technology. A formatter may be application to number, date time values, other values, or a combination thereof. In accordance with one or more embodiments of the technology, functions (134) are the re-usable piece of code, which takes a set of inputs and return an output. Examples of functions include concat, substring, min, max, and other functions.

In accordance with one or more embodiments of the technology, an action (136) is a piece of reusable executable functionality that can be abstracted out of any particular component so that the action may be usefully shared among multiple pages and/or context menus. Example actions include update, delete, create, check-in, check-out, download, and other actions.

In accordance with one or more embodiments of the technology, a library (138) is a group of files which constitute utility and infrastructure code. Example libraries include application startup code, action manager, type manager, utility, and logger. The processing components may also each be associated with a set of options that define how processing components are used.

In one or more embodiments of the technology, an application model (108) is a generic model for any web application. The application model includes pages (140), fragments (142), data actions and data sources (144), session variables (146), application master (148), context menus (150), action flows (152), and a pick list (154). Each of these components of the application model is described below.

A page (140) in the application model (108) is a template for a web page. In other words, a page in the application model (108) is a template for a complete and individual document that is displayable to the end user. In one or more embodiments of the technology, a page in the development environment is a generic template in that the page is generic to any business object type. The generic template may include instructions for defining a webpage of a particular type, such as, for example, a create webpage, an update webpage, a validate webpage, and a delete webpage. Such instructions may, for example, include an instruction to iterate through each attribute type of the business object type and generate a field or other UI widget for the attribute type and a label in a webpage.

An activity fragment (142) represents at least a portion of an activity. In other words, an activity is a defined sequence of actions that an end user may perform using the web application. An activity fragment is a portion of the defined sequence of actions. Data actions and data sources (144) define the storage structure and storage location of the data and the actions to perform on the data.

Session variables (146) are the variables stored for a particular session between the end user and the web application executable (158). A session variable may be referred to as a session parameter. For example, session variables (146) may include connection variables and information about the end user, such as the user's credentials (e.g., user identifier), role of the end user, and other information. A session variable is a local session variable when the session variable is physically located on the client. In other words, a local session variable is local to the client, and stored in the client's local memory.

In one or more embodiments of the technology, a session variable includes functionality to store a semi-static data item. A data item may be a single indivisible unit of data or a data model having multiple data units. A semi-static data item is a data item that has a static value through the execution of the web application. In one or more embodiments of the technology, the value of semi-static data item is defined prior to execution of web application. For example, the value of the semi-static data item may be set prior to start of the session. In one or more embodiments of the technology, the semi-static data item excludes storing any description of the session between the client and server. Rather, the semi-static data item stores information that may be displayed multiple user interface widgets of the web application. For example, the semi-static data item may be a list of countries, a list of addresses, and other information.

Continuing with FIG. 1, the application master (148) defines the global look and feel of the web application in accordance with one or more embodiments of the technology. For example, the application master (148) may include various banners, menu items, fonts, colors, and other features that are displayed on and surround the individual pages. By way of another example, the application master (148) may include a template on which the pages (140) are based.

Context menus (150) are instances of menus that are dependent on the context in which the menu is selected. In other words, context menus are selected in a same or similar manner, but have options that are dependent on the context in which the context menu is displayed.

Action flows (152) are a sequence of actions that are performed. Action flows may or may not have user interaction. For example, an action flow may be completely automatic. By way of another example, an action flow may be a defined sequence of actions by which a user is guided using the web application.

In one or more embodiments of the technology, a pick list (154) is a list of displayed items from which a set of items may be selected. In other words, more than one displayed item may be selected from a pick list.

The web application design (110) is a particular design of a web application created by a developer. Specifically, the web application design (110) includes instances of the components of the application model (108) and component library (106), may execute on the runtime framework (104) and use the backend services (102).

The web application design (110) is connected to a builder (156) in accordance with one or more embodiments of the technology. The builder (156) provides a UI for a developer to create the web application design (110). In some embodiments, the developer does not need to know programming languages or other development knowledge to build the web application design. Rather, the builder (156) provides an interface by which the developer can primarily drag and drop components into a web application design (110), and enter parameters into fields to create the web application design (110). Thus, in some embodiments, a developer may be a business analyst rather than have any training in application development using a programming language.

The UI of the builder (156) may include editor features and sub-systems. The editor features may include editors for modifying various aspects or views of the web application design, and/or a builder UI to assist in the development of the web application design in accordance with one or more embodiments of the technology. For example, the editors may include business object types, documents, cases, searches, reports, pages, roles, apps, widgets, and process editors. The builder UI may include a new artifact wizard, add-on top-level menu, add-on tool bar buttons, context menus, an artifacts properties page, and a model editor.

The builder (156) also includes functionality to create the web application executable (158) from the web application design (110). In other words, the builder constructs the instructions for the web application executable from the web application design that is created using a drag and drop framework in accordance with one or more embodiments of the technology. The builder (156) may include components and functionality to perform artifact management, validate the web application, generate code, and package and deploy the web application. The builder (156) may also include components functionality to perform source control and project/library management.

Figure 2:
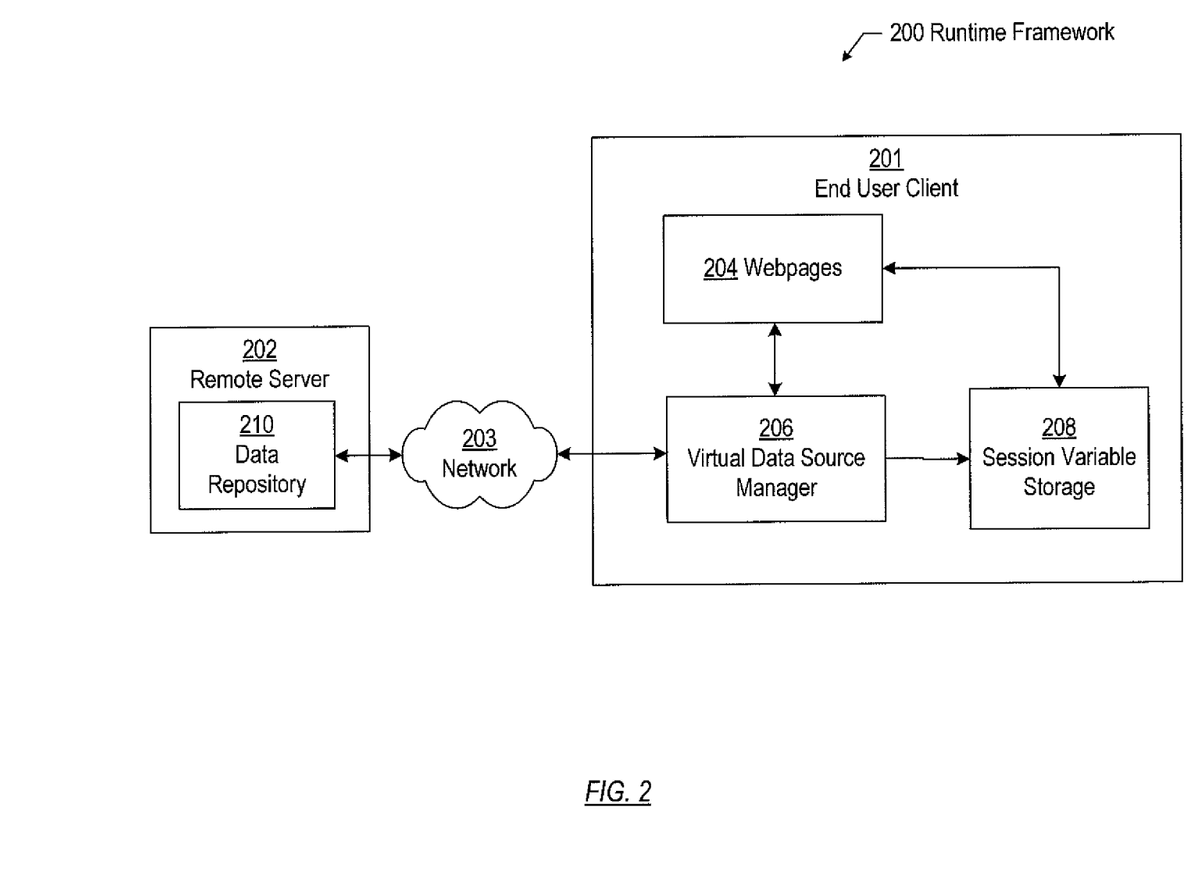

FIG. 2 shows a schematic diagram of a runtime framework (200) in accordance with one or more embodiments of the technology. In particular, FIG. 2 shows a schematic of the runtime framework when the web application is deployed and executing in accordance with one or more embodiments of the technology. As shown in FIG. 2, the runtime framework (200) includes a remote server (202) and an end user client (201) connected via a network (203). In one or more embodiments of the technology, the network is a local area network (LAN), a wide area network (WAN) such as the Internet, mobile network, or any other type of network or combination of networks. The end user client (201) and remote server (202) are described below.

In one or more embodiments of the technology, the remote server (202) is a server that is separate via the network from the end user client (201) such that information transmitted between the remote server (202) and end user client (201) is only via the network (203). In other words, a direct connection does not exist between the remote server (202) and the end user client (201) in accordance with one or more embodiments of the technology.

In one or more embodiments of the technology, the remote server (202) includes functionality to maintain a data repository (210). The data repository (210) is any type of storage unit and/or device (e.g., a file system, database, collection of tables, or any other storage mechanism) for storing data. Further, the data repository (210) may include multiple different storage units and/or devices. The multiple different storage units and/or devices may or may not be of the same type or located at the same physical site. The data repository (210) includes functionality to store data items. In one or more embodiments of the technology, at least a portion of the data items are semi-static data items, such as the semi-static data items discussed above with reference to FIG. 1.

In one or more embodiments of the technology, the end user client (201) is the client side portion of the web application that executes in a web browser. The end user client may include a session variable storage (208) in accordance with one or more embodiments of the technology. In one or more embodiments of the technology, the end user client (201) includes functionality to execute webpages (204) and a virtual data source manager (206).

In one or more embodiments of the technology, session variable storage (208) includes functionality to store local session variables. In one or more embodiments of the technology, each local session variable may have a session variable identifier and a session variable value. The session variable identifier is an alphanumeric and/or symbolic unique identifier of a local session variable. The session variable value is the value of the local session variable. In one or more embodiments of the technology, at least one local session variable includes functionality to store a data item. In particular, the at least one local session variable in the session variable storage includes functionality to store a value of a data item, such as the semi-static data item discussed above with reference to FIG. 1. One or more local session variables may further be configured to store session state information.

Continuing with the end user client (201), in one or more embodiments of the technology, the webpages (204) are a particular instance of a webpage generated in the development environment. The webpage is displayed on an end user's device. In other words, the webpage is an instance of a page, discussed above, that is rendered by a web browser and displayed to a user. The web pages (204) may include UI widgets and data actions. The UI widgets may be instances of the same or similar UI widgets discussed above with reference to FIG. 1. In some embodiments, UI widgets include functionality to receive data from a user. For example, UI widgets may correspond to fields, textboxes, radio buttons, checkboxes, or other elements of a user interface that may receive from an end user. In one or more embodiments of the technology, data actions correspond to commands to perform an action on data. For example, data actions may correspond to selectable buttons for the end user to issue a command. In the example, the data actions may correspond to update, new, delete, or other actions. In one or more embodiments of the technology, the various corresponding actions may use data from multiple data sources. The data used by multiple actions may be partially or completely overlapping.

The virtual data source manager (206) is software code distributed with a web application to the end user client (201) that includes functionality to collect data items and store the data items in the session variable storage. The virtual data source manager (206) may be a data action on a webpage, or separate from the webpage as shown in FIG. 2. In particular, the virtual data source manager (206) is communicatively connected to data repository (210) and includes functionality to issue a request to the data repository for a value of a data item, receive the value of the data item, and store the value in the session variable storage (208) as a local session variable. In some embodiments, the virtual data source manager (206) may include functionality to detect which semi-static data items are repetitively used by components on the web pages, and automatically create session variables for the data items. The virtual data source manager (206) may further include functionality to intercept requests for the data items, and respond with the value from the created session variables.

While FIGS. 1 and 2 show a configuration of components, other configurations may be used without departing from the scope of the technology. For example, various components may be combined to create a single component. As another example, the functionality performed by a single component may be performed by two or more components.

Figure 3:
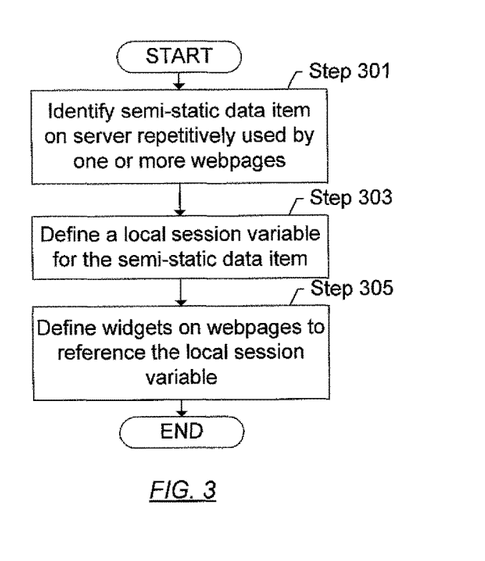
FIGS. 3 and 4 show flowcharts in accordance with one or more embodiments of the technology.
Figure 4:
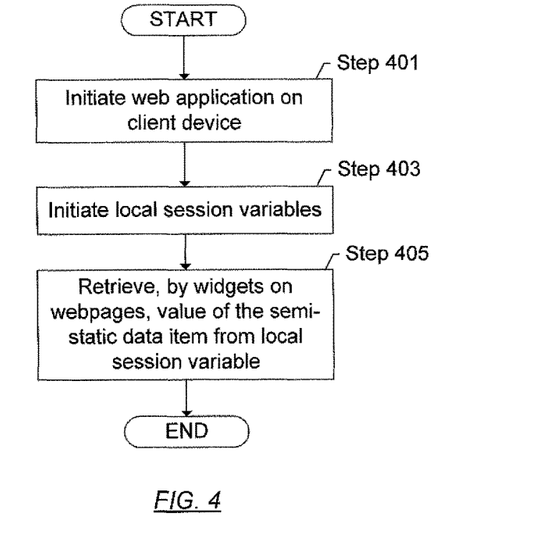

FIGS. 3 and 4 show flowcharts in accordance with one or more embodiments of the technology. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 3 shows a flowchart for creating a web application design. FIG. 3 may be performed by and/or using the components of FIG. 1. In Step 301, semi-static data items that are repetitively used by one or more web pages are identified in accordance with one or more embodiments of the technology. In one or more embodiments of the technology, the development environment shown in FIG. 1 facilitates a drag and drop and an expression based development of a web application. Thus, using the developer tools offered by the development environment, a developer may drag and drop components into a web application design to define various components of the web application design. Some of the components may have predefined templates and logic. In such a scenario, once dragged into the web application design, the developer may submit values of various parameters of the components. For example, the developer may submit a unique identifier, any references, or any other information. For a webpage, the developer may create UI widgets on the webpage. The developer may also define various data actions for the webpage. During development of one or more of the web pages, the developer may determine that a semi-static data item is used multiple times by components on the webpages.

In Step 303, a local session variable is created for the semi-static data item. In one or more embodiments of the technology, the developer may access the session variable definition and create a new local session variable that links to the value of the data item on the remote storage. Hidden from the developer, the builder may generate the web application that issues the corresponding calls to obtain the value of the data item from the remote storage and store the value in the session variable storage. In one or more embodiments of the technology, the developer may use the drag and drop facility of the local session variables to define a new local session variable to store the value of the data item.

In Step 305, widgets are defined on the webpages that reference the created local session variable. In other words, for each component on the webpage that references the semi-static data item, the developer may set the component to reference the local session variable rather than remote storage.

Thus, receiving the web application definition may include receiving the developer's input through the graphical user interface of the developer environment and generating the internal version of the web application design while the web application design is being developed. In one or more embodiments of the technology, for each expression, an instruction may be generated, such as by a code generator, to implement the expression. For example, the expression may be encapsulated in an instruction for the UI widget. Thus, the developer does not need to specify the instructions of the webpage. Rather, the developer may simply drag and drop UI widgets, provide properties for the UI widgets, and have the builder generate the code for each webpage and the web application.

Once the code is generated, the web application may be executed. FIG. 4 shows a flowchart of executing a web application in accordance with one or more embodiments of the technology. In one or more embodiments of the technology, the operations in FIG. 4 are performed by the end user client, such as a web browser and using the components of FIG. 2. In Step 401, the web application is initiated on the client device in accordance with one or more embodiments of the technology. For example, the user using the client device may start executing the web application in a browser on the client device.

In Step 403, local session variables are initiated in accordance with one or more embodiments of the technology. After or as part of initiating execution of the web application, one or more of the local session variables are initiated. The local session variables may be initiated at once or on demand or a combination thereof. For example, one or more of the local session variables may be initiated as part of initiating execution of the web application. As another example, one or more of the local session variables may be initiated in response to an event being triggered, such as a request by a widget of the web application to use the local session variable or a particular web page being displayed. When initiated, the values for the local session variables are obtained and stored in local storage on the client. Thus, any access to such session variables is local rather than remote. For local session variables that store values of semi-static data items existing on a remote server, the values are obtained from the remote server and stored in the local session variables when the local session variables are initiated. Thus, one or more embodiments allow for the values of such semi-static data items to change between executions of the web application, while at the same time providing the benefit of local rather than remote data access to obtain the values.

In Step 405, widgets on the webpages retrieve the values of the semi-static data items from the local session variable collector in accordance with one or more embodiments of the technology. The widgets may then process the value to perform the functions of the web application. For example, processing the value may be using the value to obtain another value or set of values, such as by performing a calculation using the value, creating a query with the value, determining whether a condition exists, performing another operation, or any combination thereof. Processing the value may further include displaying the value in the web page. For example, if the widget is a user interface widget, the value may be displayed in the user interface as the value for the widget. By way of a more concrete example, the value may be a list of options for selection by a user. Thus, processing the value may include displaying the list of options (e.g., in a drop down menu, set of radio buttons, in a combo box, or in another UI widget), and receiving a selection of an option (i.e., sub-item) in the list of options.

Although not shown in FIGS. 3 and 4, in some embodiments, the developer may only define data items in the repository as being semi-static. In such embodiments, during runtime, the virtual data source manager may detect repetitive use of a data item that is marked as semi-static. For example, the virtual data source manager may intercept each request for a value of a data item to remote storage and determine whether the data item is marked as at least semi-static. If the data item is marked as semi-static, the virtual data source manager may determine whether the number of accesses to the data item exceeds a threshold number, and create a local session variable for the data item when the number exceeds the threshold. Thereafter, the virtual data source manager may redirect requests for the value of the data item to the created local session variable. In such a scenario, the developer does not need to explicitly create local session variables for repetitively used data items.

Alternatively or additionally, although not shown in FIGS. 3 and 4, the development environment may include an optimization engine that includes functionality to automatically determine when multiple components access the same data item. In other words, as part of building the web application, the optimization engine may determine, for each data item, the number of accesses to the data item. If the number of accesses exceeds a threshold, the development environment may automatically create a local session variable for the data item and link the widgets to the data item. In some embodiments, the development environment may suggest the change to the developer in the development user interface and receive confirmation to make the change to the web application from the developer. Thus, execution may proceed as shown in FIG. 4.

FIGS. 5.1, 5.2, and 5.3 show examples in accordance with one or more embodiments of the technology. The following examples are for explanatory purposes only and not intended to limit the scope of the technology. FIGS. 5.1, 5.2, and 5.3 show an example of the development environment, such as the development environment in FIG. 1.

Figure 51:
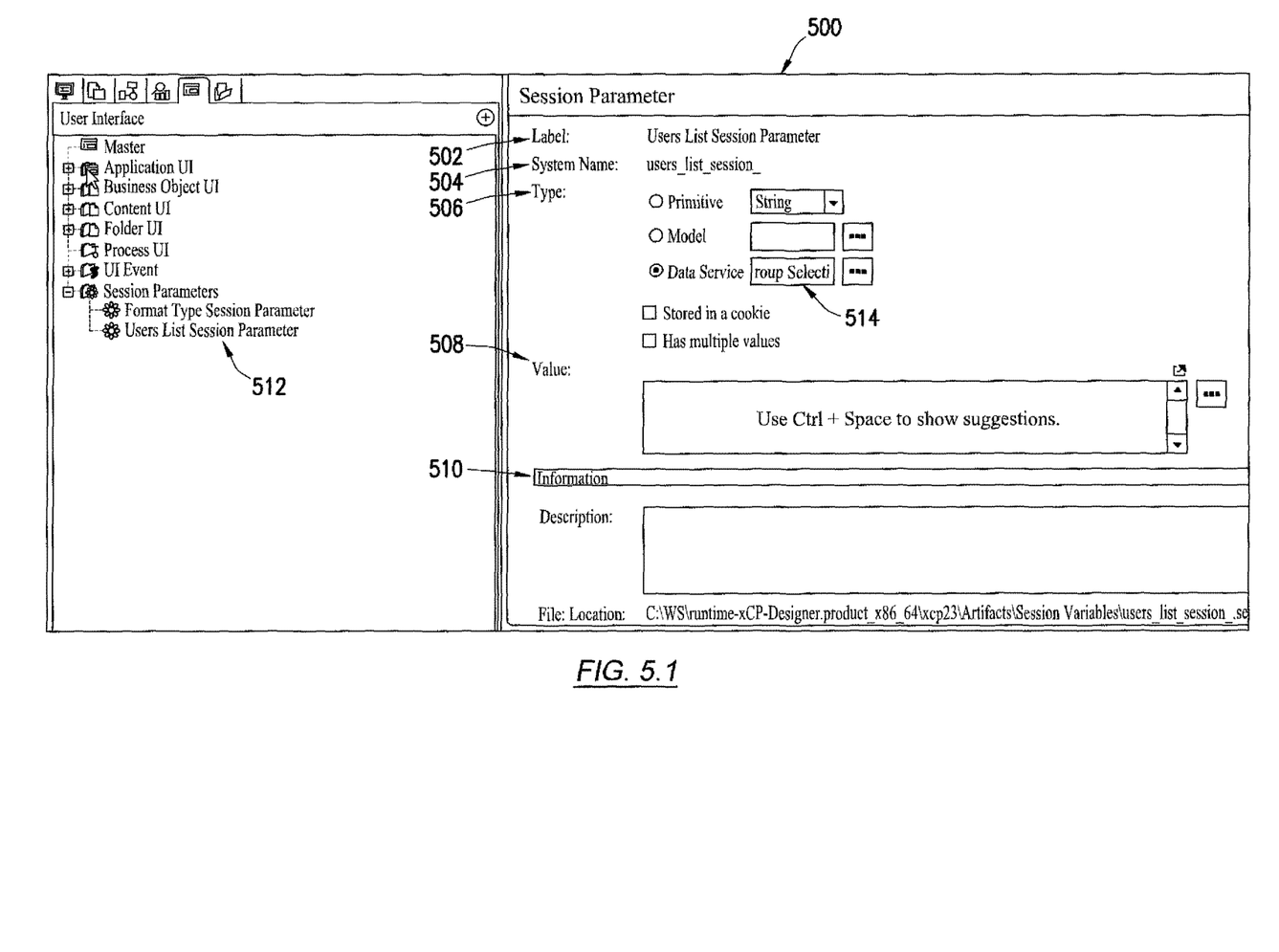

FIG. 5.1 shows an example user interface (500) for defining a session parameter that stores a semi-static data item in accordance with one or more embodiments of the technology. As shown in FIG. 5.1, the developer may add a label (502) that may be used by a developer, a system name (504) that is used by the system to identify the session parameter, a type (506), a value (508), and a description (510). Here, the developer is defining the users list session parameter (512). The developer defines the type to be a data service of group selection (514). The value (508) is populated from the remote server and may be performed during application initialization in client browser. In one or more embodiments of the technology, the initialization of data service session parameter may occur in either following conditions: 1. During application initialization in client browser machine; and 2. When any of the input to the data service configured in the session parameter changes.

Figure 52:
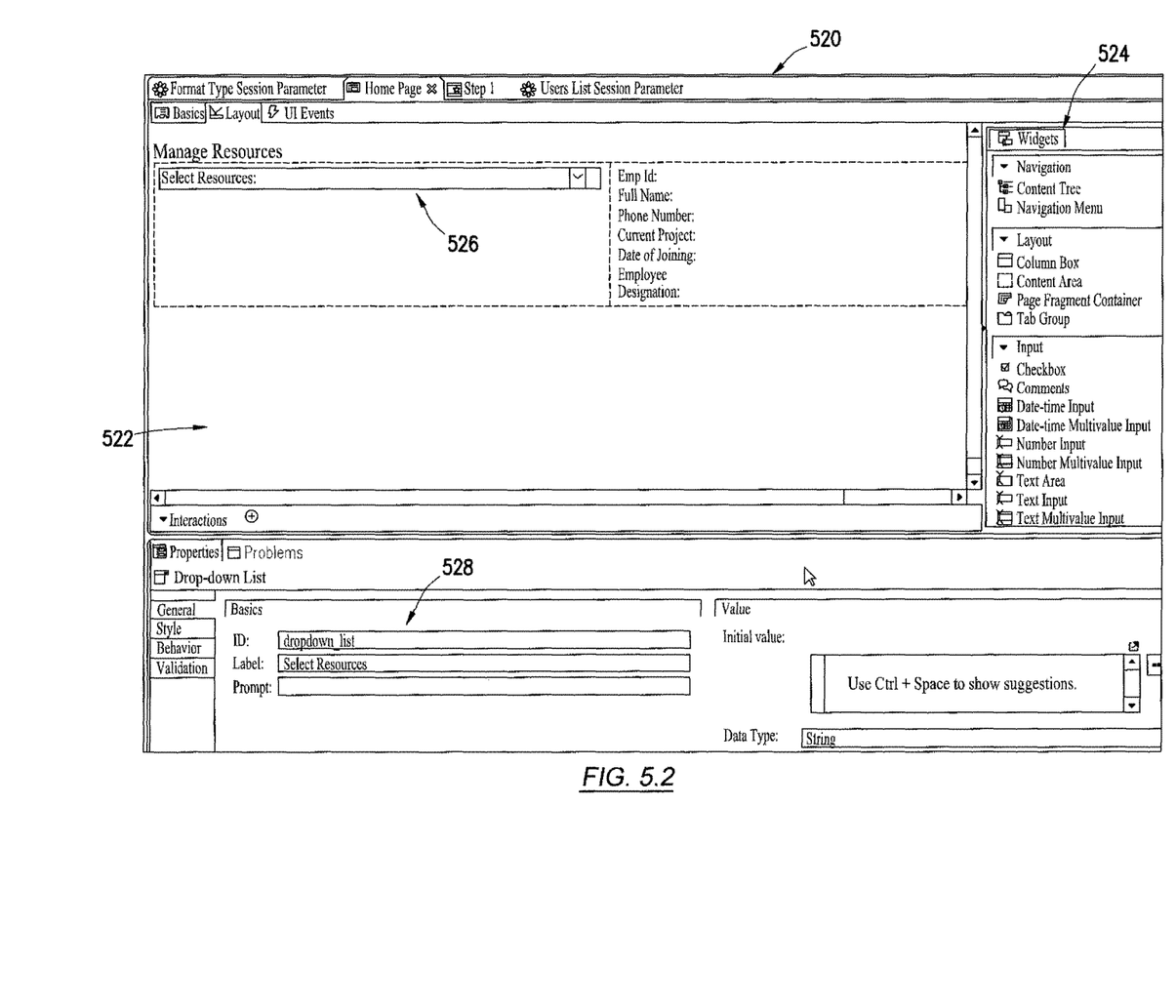

FIG. 5.2 shows a user interface of the development environment (520) for defining a web page (522) that may reference the newly created session parameter in FIG. 5.1. The developer may drag widgets from the side menu of widgets (524) onto the web page (522) to create instances of the UI widgets. As shown in the user interface in FIG. 5.2, the developer may select a UI widget (526) that displays a drop down list. The pane (528) at the bottom shows the options for the UI widget (526).

Figure 53:
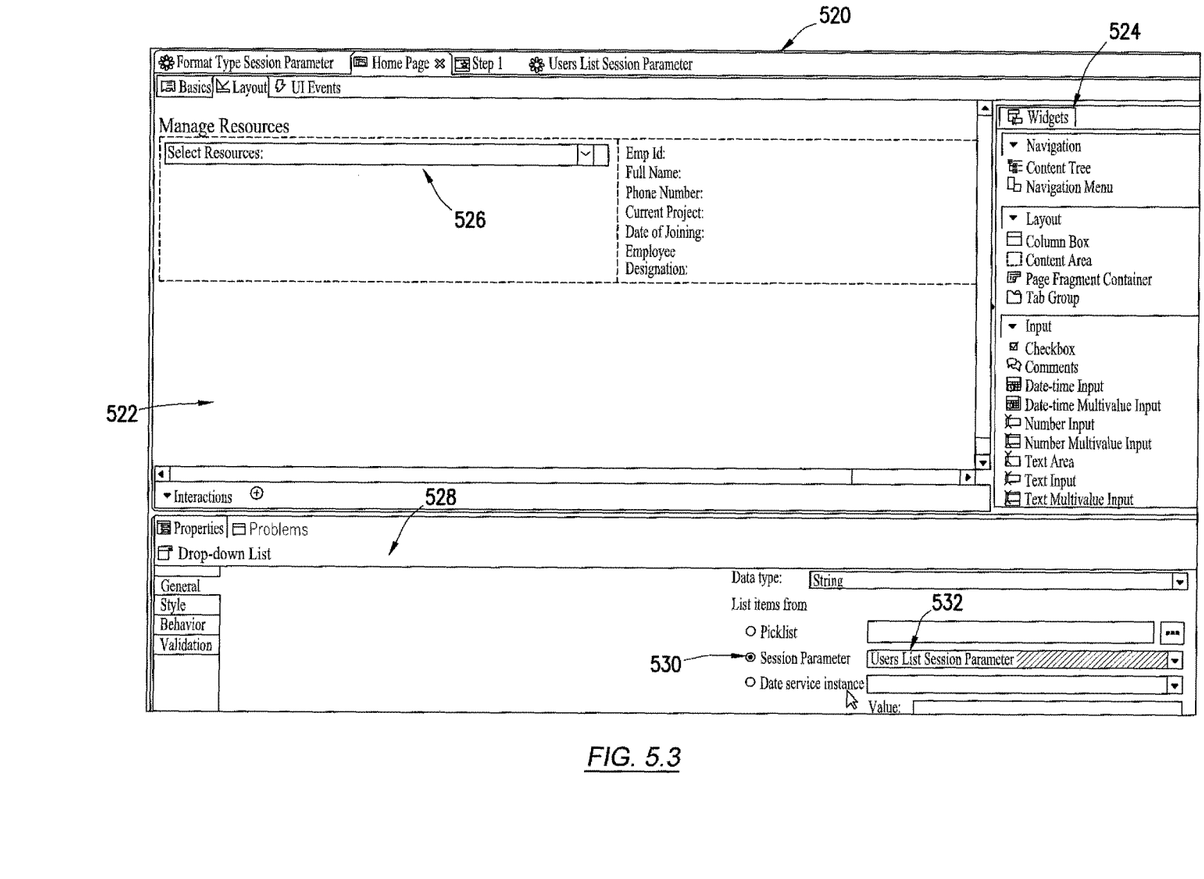

Turning to FIG. 5.3, scrolling through the options, the developer may select to list items in the drop down list from a session parameter (530). The developer may then submit a reference to the session parameter created in FIG. 5.1 in box (532). Thus, during execution of the web page (522), the client device accesses the local session parameters to obtain the options for the UI widget (526) rather than accessing the remote server. If multiple UI widgets use the same session parameter rather than accessing the remote server, one or more embodiment may decrease the bandwidth used to execute the web application and increase the speed at which the web application is executed.

In particular, FIG. 5.2 shows steps for an application designer to configuring the drop-down widget on the page, and FIG. 5.3 shows mapping the drop-down widget to be populated using data service session parameter configured in FIG. 5.1.

Figure 6:
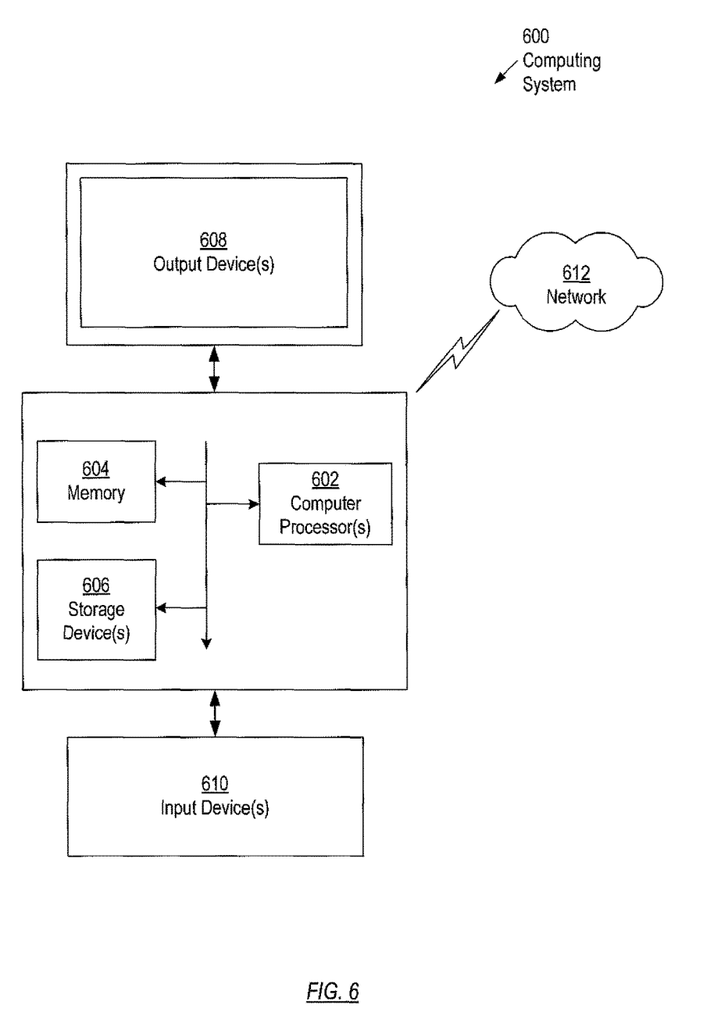
FIG. 6 shows a computing system in accordance with one or more embodiments of the technology.

Embodiments of the technology may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (600) may be located at a remote location and connected to the other elements over a network (612). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:
1. A method for data source fetch comprising:
   initiating execution of a web application on a client device;
   obtaining, during execution of the web application, a value of a data item from a server via a network; and
   making a determination that the obtaining of the value of the data item exceeds a retrieval threshold, wherein in response to the determination:
   initiating, by the client device, a local session variable for the web application; and
   storing the value in the local session variable on local storage;
after storing the value in the local session variable:
   receiving, by the web application, a request for the value;
   directing the request to the local session variable, wherein the value is obtained from the local session variable; and
   processing the value by the web application.

2. The method of claim 1, wherein the value of the data item remains constant during the execution of the web application.

3. The method of claim 1, wherein the value of the data item is set prior to executing the web application.

4. The method of claim 1, wherein the local session variable is initiated while initiating execution of the web application on the client device.

5. The method of claim 1, further comprising, for at least one of a plurality of widgets in the web application, populating the value into a displayed list of selectable options.

6. The method of claim 1, wherein the value of the data item is a data structure comprising a plurality of sub-items.

7. The method of claim 1, wherein at least two of a plurality of widgets are located on a same page of the web application.

8. The method of claim 1, wherein processing the value comprises displaying the value in the web application.

9. A system for data source fetch comprising:
a computer processor; and
memory storing a web application, which, when executed on the computer processor, causes the computer processor to:
   initiate execution of the web application on a client device;
   obtain a value of a data item from a server via a network; and
   make a determination that the obtaining of the value of the data item exceeds a retrieval threshold,
   wherein in response to the determination:
      initiate, by the client device, a local session variable for the web application; and
      store the value in the local session variable on local storage;
   after storing the value in the local session variable:
      receive, by the web application, a request for the value;
      direct the request to the local session variable, wherein the value is obtained from the local session variable; and
      process the value by the web application.

10. The system of claim 9, wherein the value of the data item remains constant during the execution of the web application.

11. The system of claim 9, wherein the value of the data item is set prior to executing the web application.

12. The system of claim 9, wherein the local session variable is initiated while initiating execution of the web application on the client device.

13. The system of claim 9, wherein the web application further causes the computer processor to, for at least one of a plurality of widgets in the web application, populate the value into a displayed list of selectable options.

14. The system of claim 9, wherein the value of the data item is a data structure comprising a plurality of sub-items.

15. The system of claim 9, wherein at least two of a plurality of widgets are located on a same page of the web application.

16. The system of claim 9, wherein processing the value comprises displaying the value in the web application.

17. A non-transitory computer readable medium for data assimilation comprising computer readable program code for:
   initiating execution of a web application on a client device;
   obtaining a value of a data item from a server via a network; and
   making a determination that the obtaining of the value of the data item exceeds a retrieval threshold,
   wherein in response to the determination:
      initiating, by the client device, a local session variable for the web application; and
      storing the value in the local session variable on local storage;
   after storing the value in the local session variable:
      receiving, by the web application, a request for the value;
      directing the request to the local session variable, wherein the value is obtained from the local session variable; and
      processing the value by the web application.

18. The non-transitory computer readable medium of claim 17, wherein the value of the data item is set prior to executing the web application.

* * * * *